April 17, 1956 E. G. SPANGLER 2,742,156
FLUID PURIFYING SEPARATORS
Filed May 24, 1952
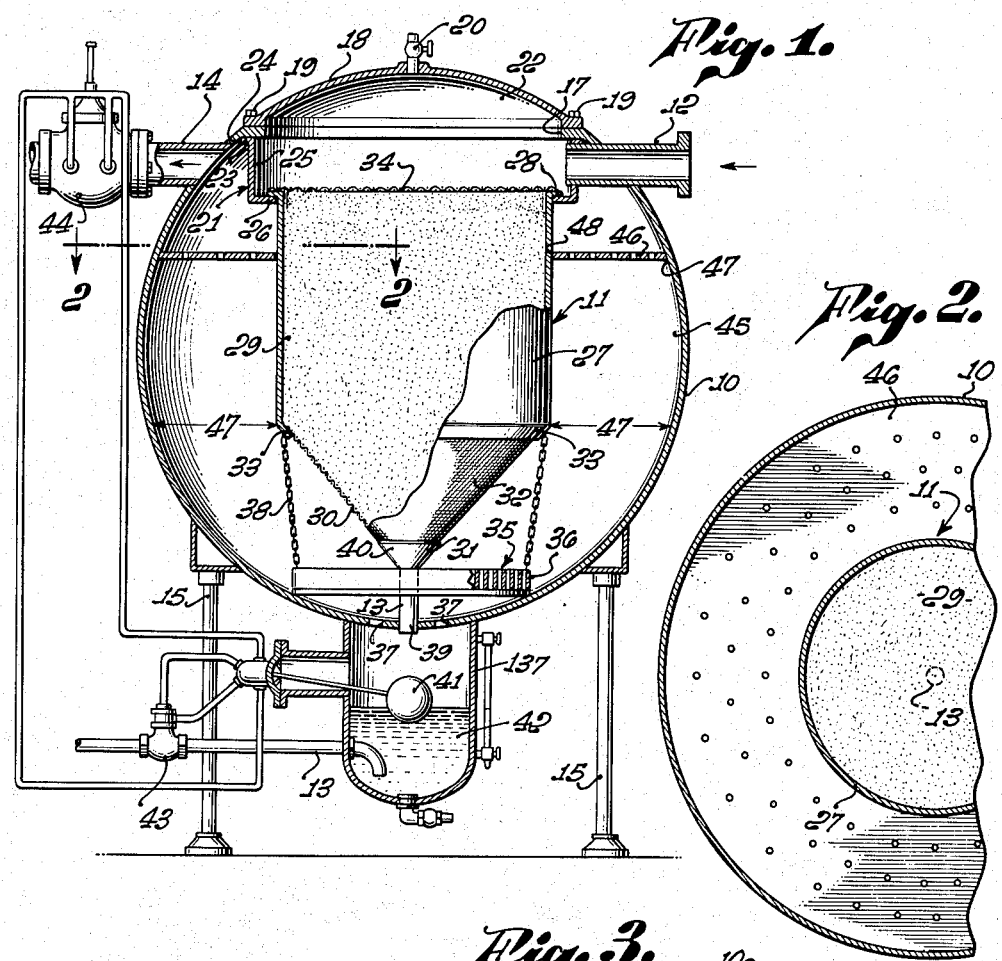
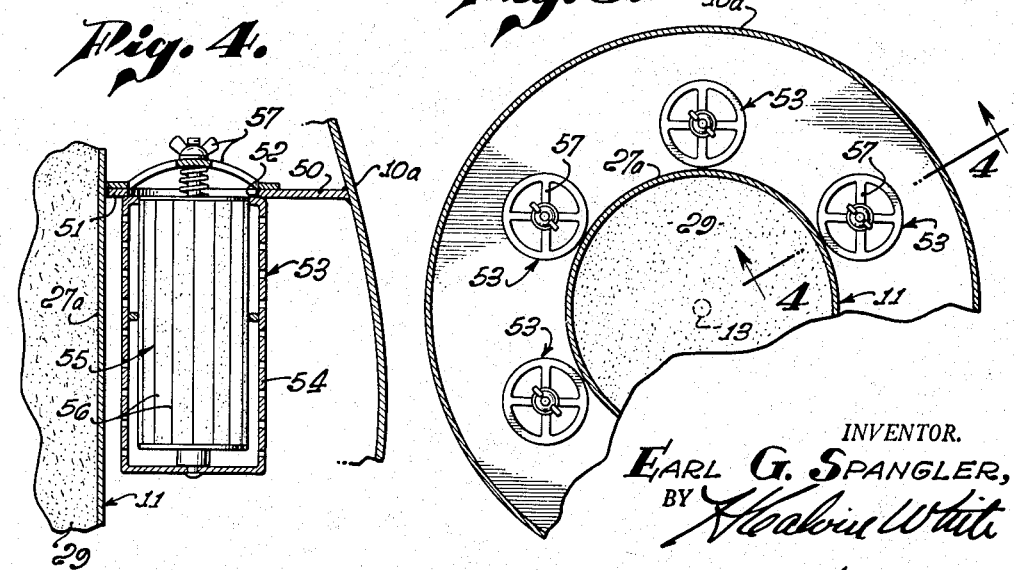
INVENTOR.
EARL G. SPANGLER,
BY
ATTORNEY.

United States Patent Office 2,742,156
Patented Apr. 17, 1956

2,742,156

FLUID PURIFYING SEPARATORS

Earl G. Spangler, Los Angeles, Calif.

Application May 24, 1952, Serial No. 289,713

17 Claims. (Cl. 210—131)

This invention relates to improved separators for removing entrainment from a fluid stream.

An important object of the invention is to provide an improved and highly efficient separator which is adapted among other uses for separating water from engine fuels, such as gasoline. Especially contemplated is a separator adapted for such use and particularly constructed for effective operation at relatively high flow rates, such as are encountered for example in the fueling of modern aircraft. At the same time, it is an object of the invention to so form the separator as to obtain maximum compactness and structural simplicity, and a minimum overall size, for a given flow rate.

Certain particular features of the present separators have to do with their special formation in a manner assuring operational effectiveness both in initially separating entrainment from a fluid stream, and is then maintaining the separated material against reentrainment by the stream. For this purpose, the devices are so constructed that several different factors tend to supplement one another in promoting effective separation. In particular, the separation is promoted, first by a filter mass through which the fluid is directed, secondly, by a separating force resulting from the fluid motion through the device, and thirdly, by a supplementary gravitational force. To achieve such a combination separating action, the main fluid stream is directed downwardly through the filter mass, and is then reversed in direction to flow upwardly toward an upper fluid outlet, leaving the heavier entrainment to continue the initial downward path to a second and bottom outlet. The filter mass tends to cause the entrained material to separate out, and where it is water to coalesce small droplets into relatively large and easily separable drops, after which both the downward motion and the force of gravity act together to cause the entrainment to fall to the bottom outlet.

Sructurally, a separator embodying the invention comprises a hollow fluid passing shell, a filter chamber contained within and spaced from a side wall of the shell, and means for passing fluid downwardly through the chamber to pass out a lower portion thereof and then upwardly along the outside of the chamber toward an upper shell outlet. A mass of filter material is located within the inner chamber for separating entrainment from the fluid to fall downwardly from the chamber toward a bottom shell outlet. Where the device is to be used for separating water from fuel, this filter means may comprise a compacted mass of wood shavings, preferably of the size and type known as excelsior.

In order to minimize the chances of reentrainment of the separated material by the primary fluid, I prefer to position across the shell beneath the filter chamber an apertured baffle unit adapted to form at the bottom of the shell a relatively quiescent area through which the separated water or the like may pass downwardly but within which it is protected against reentrainment by the rapidly moving primary fluid. Also, I find it desirable to so form the shell and chamber that the upward path of the fluid at the outside of the chamber has a portion of greater transverse sectional area than the downward path of fluid within the chamber, so that the fluid moves upwardly relatively slowly and at a rate encouraging the settling out of entrained materials. Best results are achieved when at least the lowermost portion of the upward path, and preferably the major portion of that path, has a transverse area not less than about one and one-fourth times that of the downward path.

For further assuring effecting separation of water or the like from a primary fluid, the bottom portion of the filter mass may taper downwardly to a reduced dimension lower end in a manner directing a substantial portion of the water in relatively concentrated form to that reduced lower end and out of the main stream of fluid. A tube may then be provided for conducting the water from the reduced end of the filter mass directly into a bottom water collection chamber.

Preferably, the outer shell is of spherical configuration, and the inner chamber comprises a cylindrical vertically extending wall positioned centrally within the chamber. The use of a shell and chamber of these particular configurations renders possible extreme compactness, simplicity and strength in the overall unit. Furthermore, the use of such a shell and chamber increases the separating effectiveness of the device, since the lower portions of the spherical shell and cylindrical chamber form between them an annular fluid upflow passage which progressively increases in transverse area and thus slows the upward rate of fluid flow.

To permit removal of the filter mass for cleaning or replacement without complete draining of the separator shell, I form the shell with a top access opening through which the filter chamber and contained filter mass may be withdrawn upwardly. The lower baffle unit may also be removable through that opening, and preferably is attached to the filter unit for removal with it.

Further features of the invention have to do with the provision in the fluid upflow passage about the chamber of baffle means acting to equalize the rate of fluid upflow at different locations about the chamber, even though the upper outlet to which the fluid is flowing may communicate with the package at only a single location. For this purpose, the baffle means may be formed to have fluid passing apertures progressively increasing in area away from the outlet, so that a greater resistance to fluid flow is offered at the outlet location than at other locations.

An additional feature of the invention has to do with the provision of secondary filter means in the fluid upflow passage for supplementing the filtering effect of the primary filter mass. For this purpose, I may employ one or more micronic type filter elements adapted to positively remove from the fluid stream any slight amount of entrainment remaining in the fluid stream at that point.

The above and other features and objects of the present invention will be better understood from the following detailed description of the typical embodiments illustrated in the accompanying drawing, in which:

Fig. 1 is a vertical section through a first form of separator embodying the invention;

Fig. 2 is a fragmentary horizontal section taken on line 2—2 of Fig. 1;

Fig. 3 is a fragmentary horizontal section corresponding to Fig. 2 but showing a variational form of separator; and Fig. 4 is an enlarged fragmentary vertical section taken on line 4—4 of Fig. 3.

The devices shown in the drawings are particularly adapted for separating entrained water from liquid engine fuel, such as gasoline, and will be herein described as applied to that use. Referring first to Figs. 1 and 2, the first form of separator there shown includes an outer spherical shell 10, containing at approximately its center a filter or fluid separating cartridge 11. Gasoline containing entrained water is introduced into an upper portion of the shell through an inlet 12, and flows downwardly through filter cartridge 11, which causes the entrained water to coalesce into relatively large and easily separable drops. The water falls downwardly for discharge from the shell through a lower outlet 13, while the gasoline reverses its course to flow upwardly through an annular vertically extending passage 45 at the outside of the filter cartridge to upper outlet 14.

Spherical shell 10 is supported by a number of legs 15 on a suitable supporting surface. At its upper side, the wall of shell 10 contains a central opening 17, through which the filter cartridge 11 is upwardly removable for cleaning or replacement. This upper shell opening is normally closed by a partial spherical cover 18, removably secured to the shell in any suitable manner, as by a number of circularly spaced bolts 19. Cover 18 may carry at its center a top vent fitting 20.

Near the top of the shell and beneath cover 18, the shell contains an annular partition 21, which serves the dual purposes of supporting the filter cartridge 11 and forming in the upper portion of the shell a fluid inlet space 22 for receiving fluid from inlet 12. Partition 21 includes an upper annular horizontal portion 23 having an outer edge 24 annularly engaging and welded to the shell wall at a location above gasoline outlet 14. Extending downwardly from upper portion 23, the partition has a vertical cylindrical portion 25, terminating in a lower annular inwardly extending portion 26. The fluid inlet pipe 12 extends through the outer wall of the shell and is connected into the vertical cylindrical portion 25 of partition 21, to introduce the fluids being handled into the upper space 22.

The filter cartridge 11 includes a vertically extending cylindrical imperforate side wall wall 27 forming an inner filter chamber open at its upper and lower ends. This side wall is deformed at its upper end to provide an annular outwardly extending flange 28 engageable with portion 26 of partition 21 to removably support the filter cartridge within the shell.

The chamber formed by wall 27 contains a mass of filtering or fluid separating material 29, which may take the form of a compacted mass of randomly arranged wood shavings, preferably of the type known as excelsior. As the intermixed gasoline and water flow downwardly through the filter mass, the wood shavings serve to coalesce and promote separation of the water, to fall downwardly into the bottom of the shell. The lower portion of the filter mass tapers conically downwardly at 30 to a small transverse dimension lower end 31, so that the water separated from the gasoline will have a tendency to follow the filter mass downwardly to, and discharge downwardly from the mass at a localized central portion of the shell, that is, at the reduced dimension lower end of the filter mass. As a result, a large portion of the separated water leaves the mass at this central area, where its chances of reentrainment by the gasoline are minimized.

For supporting and shaping the filter mass 29, the lower portion of this mass may be contained within a conical wire screen 32, which may in turn be supported by reception of its upper edge portion within an angularly inwardly turned lower edge 33 of the filter cartridge wall 27. The filter mass may be retained at its upper side by a suitable transverse wire screen 34.

An apertured baffle unit 35 extends horizontally across the bottom of shell 10 at a location directly beneath the filter cartridge. This baffle unit preferably takes the form of a circular honeycomb element, having a multitude of vertically extending channels 36 through which water falling from the filter mass 29 may pass downwardly for discharge through bottom openings 37 in the shell into a bottom water collection chamber 137. As will be understood, baffle unit 35 forms at the bottom of the shell a relatively quiescent area within which the separated water is protected against reentrainment by the gasoline. Unit 35 preferably is not directly connected to but merely rests on the bottom of shell 10, and may be attached to the filter cartridge, as by a number of chains 38, to be upwardly removable from the shell with the filter cartridge.

The large amounts of water leaving the lower reduced end 31 of the filter mass may be conducted directly into the lower collection chamber through a central tube 39. This tube has an upper conical funnel portion 40 received about the lower portion of the filter mass to receive all of the water which leaves the central portion of that mass. Tube 39 extends downwardly through a central opening in baffle unit 35 and through an opening in the bottom of the shell, and may be braced or otherwise fastened to either screen 32 or baffle unit 35.

The bottom chamber 137 projects downwardly from the bottom of the shell, and contains a discharge controlling float 41. This float is of a weight to float on water but not gasoline, to at all times remain at the surface of the water 42 accumulated within that bottom chamber. Float 41 controls water discharge valve 43 and gasoline discharge valve 44 in a manner maintaining the water level at a predetermined height within chamber 137, to assure that only water will discharge through line 13, and only gasoline will leave through outlet 14.

As the gasoline flows upwardly through passage 45 at the outside of the filter cartridge, there is of course a tendency for most of the gasoline to follow the shortest path toward outlet 14, and thus flow upwardly through only that portion of passage 45 directly beneath the outlet. To overcome this tendency, I provide in an upper portion of passage 45 an annular apertured horizontal baffle 46, welded at its outer edge 47 to the shell and extended to an inner edge 48 substantially engaging the filter cartridge. As best seen in Fig. 2, the apertured area of baffle 46 increases progressively about the filter cartridge from the location of outlet 14 to a location diametrically opposite the outlet. The restriction to gasoline flow thus becomes progressively greater toward the outlet location, to result in an equalization of the flow about the filter chamber.

In placing the separator in use, the supply line for gasoline containing entrained water is connected to inlet 12, and the gasoline and water discharge lines are connected to outlets 14 and 13 respectively. The mixed fluids then enter upper space 22 from the inlet, and flow downwardly through the filter mass 29 within which small droplets of water carried in the gasoline coalesce into larger and more easily separable drops. Due to the tendency of the water to adhere to the excelsior mass, the bulk of the water follows the conical contour of the bottom portion of the mass into tube 31 for direct delivery into bottom chamber 137. The rest of the water falls downwardly into baffle unit 35 and then through openings 37 into chamber 137.

The gasoline, which is lighter than the water, reverses its flow at the bottom of the filter mass to flow upwardly about the outside of the filter cartridge to outlet 14. In order to minimize the possibility of any water being carried upwardly with the gasoline, the relative dimensions of the filter chamber and shell are such that the lowermost portion 47 of the gasoline upflow passage 45 between the shell and filter cartridge side walls has a substantially greater transverse or horizontal sectional area than does the fluid downflow passage formed within the filter cartridge, so that the gasoline moves upwardly at a relatively slow rate permitting settling out of any carried water. For best results, gasoline upflow passage 45 has at its lowermost portion, and preferably along the major portion of its vertical extent, a minimum transverse or horizontal sectional area at least about 1¼ times as great as the maximum horizontal sectional area of the downflow passage formed within side wall 27 of the filter chamber.

Figs. 3 and 4 represents fragmentarily a variational form of separator, which is constructed in the same manner as the first form except that a number of micronic type filter elements are mounted within the gasoline upflow passage for supplementing the filtering effect of the excelsior mass 29. In Figs. 3 and 4, the spherical shell side wall is designated at 10a, and the cylindrical vertically extending filter cartridge side wall is designated at 27a. An essentially annular sheet metal mounting ring 50 is welded to and extends horizontally inwardly from the spherical shell wall 10a to an inner edge 51 substantially engaging the filter cartridge side wall 27a. Ring 50 contains at a number of circularly spaced locations a series of circular openings 52, through which the gasoline may flow upwardly past the ring toward the gasoline outlet. At each of the fluid passing openings 52, ring 50 carries a micronic filter unit 53 through which the gasoline must flow in passing through the corresponding opening. Each of these filter units may include an apertured case 54 depending from mounting ring 50 about one of the openings 52, and containing a filter element 55, which the gasoline flows transversely into and then upwardly through as indicated by the arrows of Fig. 4. Though elements 55 may be of various conventional types, I consider particularly desirable an element of a type comprising a sheet of paper formed into a tubular vertically extending filter wall and corrugated or folded longitudinally at 56. This paper filter wall may be treated with a suitable resinous plastic material adapted to positively prevent the passage through the filter element of any water. Each of the filter elements may be retained within its case 54 in any conventional manner, as for instance by a fluid passing spider and wing nut arrangement 57.

The operation of the Figs. 3 and 4 form of the invention is the same as that of Fig. 1 except for the passage of the gasoline through filter elements 55 during its upward movement toward the gasoline outlet. This second form of the invention may be employed where absolute 100% filtering efficiency is desired.

I claim:

1. A liquid separator comprising a shell, a chamber within said shell having a lower opening communicating with the shell and having a side wall spaced from a side wall of the shell to form a passage extending generally vertically therebetween and about the chamber, an inlet for introducing fluid containing heavier liquid entrainment into an upper portion of said chamber to flow downwardly therethrough and out said lower opening, a filter mass within said chamber for separating and coalescing said entrainment from the fluid to pass downwardly to a lower portion of the shell, outlet fitting means communicating with an upper portion of said vertical passage at one side of the chamber and to which fluid leaving said lower opening of the chamber flows upwardly through said passage, a baffle within said vertical passage extending about said chamber and between said chamber and shell wall and containing apertures through which said fluid flows upwardly toward said outlet fitting means, the apertured area of said baffle increasing progressively from said one side of the chamber toward an opposite side thereof and a second outlet for discharging said separated entrainment from the lower portion of the shell.

2. A separator for removing water from liquid engine fuel comprising an essentially spherical shell having a top access opening, an openable cover for said opening, an annular partition extending inwardly from an upper portion of the shell wall and containing an opening beneath said access opening, a chamber having an imperforate cylindrical side wall extending vertically through said opening in the partition and downwardly therebeneath in annularly spaced relation to the shell side wall, said chamber having open upper and lower ends communicating with the shell above and beneath said partition respectively, an annular flange on said chamber resting on said partition to support the chamber in the shell, an inlet for introducing liquid fuel containing entrained water into the shell above said partition to flow downwardly through the chamber and out its open lower end, a mass of excelsior within said chamber acting to coalesce said water to fall downwardly to the bottom of the shell, said excelsior having a conically downwardly tapered bottom portion, means retaining said excelsior in said downwardly tapered shape, a fuel outlet communicating with an upper portion of the annular space between said chamber and shell side walls and beneath said partition and to which said fuel flows upwardly from the lower end of the chamber through said space, said annular space having along the major portion of its vertical extent a transverse sectional area at least about 1¼ times as great as the maximum transverse sectional area of said chamber, said chamber and excelsior being removable upwardly from the shell through said access opening, a water collection chamber projecting downwardly from the bottom of the shell and communicating therewith to receive water therefrom, a water outlet leading from said collection chamber, a float in said collection chamber controlling the fluid discharge from the shell and thereby the water level within the collection chamber.

3. A separator for removing water from liquid engine fuel comprising an essentially spherical shell having a top access opening, an openable cover for said opening, an annular partition extending inwardly from an upper portion of the shell wall and containing an opening beneath said access opening, a chamber having an imperforate cylindrical side wall extending vertically through said opening in the partition and downwardly therebeneath in annularly spaced relation to the shell side wall, said chamber having open upper and lower ends communicating with the shell above and beneath said partition respectively, an annular flange on said chamber resting on said partition to support the chamber in the shell, an inlet for introducing liquid fuel containing entrained water into the shell above said partition to flow downwardly through the chamber and out its open lower end, a mass of excelsior within said chamber acting to coalesce said water to fall downwardly to the bottom of the shell, said excelsior having a conically downwardly tapered bottom portion, means retaining said excelsior in said downwardly tapered shape, a fuel outlet communicating with an upper portion of the annular space between said chamber and shell side walls and beneath said partition and to which said fuel flows upwardly from the lower end of the chamber through said space, said annular space having along the major portion of its vertical extent a transverse sectional area at least about 1¼ times as great as the maximum transverse sectional area of said chamber, said chamber and excelsior being removable upwardly from the shell through said access opening, said outlet being localized at a predetermined side of the shell, an annular baffle within said annular space and beneath said outlet and containing fluid passing apertures progressively increasing in aperture area away from said predetermined side of the shell, a honeycomb baffle extending across a lower portion of the shell beneath said chamber to form a relatively quiescent lower water receiving area, a water collection chamber projecting downwardly from the bottom of the shell and communicating therewith to receive water therefrom, a water outlet leading from said collection chamber, a float in said collection chamber controlling the fluid discharge from the shell and thereby the water level within the collecting chamber.

4. A separator for removing water from liquid engine fuel comprising an essentially spherical shell having a top access opening, an openable cover for said opening, an annular partition extending inwardly from an upper portion of the shell wall and containing an opening beneath said access opening, a chamber having an imperforate cylindrical side wall extending vertically through said opening in the partition and downwardly therebeneath in annularly spaced relation to the shell side wall, said chamber having open upper and lower ends communicating with the shell above and beneath said partition respectively, an annular flange on said chamber resting on said partition to support the chamber in the shell, an inlet for introducing liquid fuel containing entrained water into the shell above said partition to flow downwardly through the chamber and out its open lower end, a mass of excelsior within said chamber acting to coalesce said water to fall downwardly to the bottom of the shell, said excelsior having a conically downwardly tapered bottom portion, means retaining said excelsior in said downwardly tapered shape, a fuel outlet communicating with an upper portion of the annular space between said chamber and shell side walls and beneath said partition and to which said fuel flows upwardly from the lower end of the chamber through said space, said annular space having along the major portion of its vertical extent a transverse sectional area at least about 1¼ times as great as the maximum transverse sectional area of said chamber, said chamber and excelsior being removable upwardly from the shell through said access opening, an annular member extending inwardly from the side wall of said shell within said annular space, and a plurality of micronic filter elements mounted to said ring and through which the fuel flows in passing to said outlet, a honeycomb baffle extending across a lower portion of the shell beneath said chamber to form a relatively quiescent lower water receiving area, a water collection chamber projecting downwardly from the bottom of the shell and communicating therewith to receive water therefrom, a water outlet leading from said collection chamber, a float in said collection chamber controlling the fluid discharge from the shell and thereby the water level within the collection chamber.

5. A liquid separator comprising: a closed, essentially spherical shell; a chamber within said shell having a side wall projecting downwardly from an upper portion of said shell and spaced from a side wall portion thereof to form a vertical passage within said shell and about said chamber, said chamber having an opening in a lower portion thereof communicating with a lower portion of said vertical passage; an inlet for introducing fluid containing heavier liquid entrainment into an upper portion of said chamber for flow downwardly therethrough and out said chamber opening; a filter mass within said chamber and filling the cross-sectional area thereof for separating and coalescing the entrainment from the fluid for passage downwardly to a lower portion of said shell, said mass having a generally downwardly facing undersurface supported and confined within the horizontal outline of said chamber opening and spaced from said shell lower portion; an outlet at the upper portion of said vertical passage for discharge of the fluid leaving said chamber lower opening and flowing upwardly through said passage; and a second outlet in said lower shell portion for discharging said separated entrainment, the interior of said shell in the direction of flow toward said passage outlet and beyond said undersurface being free of filter mass material which will effect coalescence of the entrainment.

6. A liquid separator comprising: a closed, essentially spherical shell; a chamber within said shell having an imperforate cylindrical side wall projecting downwardly from an upper portion of said shell and annularly spaced from a side wall thereof to form an annular vertical passage within said shell and about said chamber, said chamber having an open lower end communicating with a lower portion of said vertical passage; an inlet for introducing a fluid containing heavier liquid entrainment into an upper portion of said chamber for flow downwardly therethrough and out of said open lower end thereof; a filter mass within said chamber and filling the cross-sectional area thereof for separating and coalescing the entrainment from the fluid for passage downwardly to a lower portion of said shell, said mass having a generally downwardly facing undersurface supported and confined within the horizontal outline of said chamber open lower end and spaced from said lower portion of said shell; an outlet at the upper portion of said vertical passage for discharge of the fluid leaving said chamber open lower end and flowing upwardly through said passage; and a second outlet in said lower portion of said shell for discharging the separated entrainment, the interior of said shell in the direction of flow toward said passage outlet and beyond said undersurface being free of filter mass material which will effect coalescence of the entrainment.

7. A liquid separator comprising: a closed shell having an upper access opening; a removable cover for said opening; a chamber within said shell beneath said cover having a side wall spaced from a side wall of said shell to form a passage extending generally vertically therebetween, said chamber having an open lower end communicating with a lower portion of said vertical passage; an inlet for introducing fluid containing heavier liquid entrainment into an upper portion of said shell and into the upper end of said chamber for flow downwardly therethrough and out said chamber open lower end; a filter mass within said chamber and filling the cross-sectional area thereof for separating and coalescing the entrainment from the fluid for passage downwardly to a lower portion of said shell, said mass having a generally downwardly facing undersurface supported and confined within the horizontal outline of said chamber open lower end and spaced from said shell lower portion, said chamber having an open upper end and a peripheral flange extending thereabout resting on a shoulder on said shell to support said chamber therein and to close off communication between the upper portions of said chamber and said vertical passage, said chamber and filter mass being upwardly removable from said shell through said upper access opening; means carried by said chamber for retaining said filter mass therein during upward removal thereof; a first outlet communicating with an upper portion of said vertical passage for discharge of fluid leaving said chamber open lower end and flowing upwardly through said passage; and a second outlet in said shell lower portion for discharging the separated entrainment, the interior of said shell in the direction of flow toward said first outlet and beyond said undersurface being free of filter mass material which will effect coalescence of the entrainment.

8. A liquid separator comprising: a closed, essentially spherical shell; a chamber within said shell having a side wall projecting downwardly from an upper portion of said shell and spaced from a side wall thereof to form a vertical passage within said shell and about said chamber, said chamber having an open lower end communicating with a lower portion of said vertical passage; an inlet for introducing fluid containing heavier liquid entrainment into an upper portion of said chamber for flow downwardly therethrough and out said open lower end thereof; a filter mass within said chamber and filling the cross-sectional area thereof for separating and coalescing the entrainment from the fluid for passage downwardly to a lower portion of said shell, said mass having a generally downwardly facing undersurface supported and confined within the horizontal outline of said chamber open lower end and spaced from said shell lower portion; an outlet at the upper portion of said vertical passage for discharge of fluid leaving said chamber lower open end and flowing upwardly through said passage; and a second outlet in said shell lower portion for discharging the separated entrainment, said vertical passage having an upward, progressively-increasing, transverse sectional area and having a portion with a transverse sectional area at least about one and one-fourth times as great as the transverse area of said chamber opening, and the interior of said shell in the direction of flow toward said passage outlet and beyond said undersurface being free of filter mass material which will effect coalescence of the entrainment.

9. A liquid separator comprising: a closed shell; a chamber therewithin having a side wall spaced from a side wall of said shell to form a passage extending generally vertically therebetween, said chamber having an open lower end; an inlet for introducing a primary fluid containing heavier liquid entrainment into an upper portion of said chamber for flow downwardly therethrough and out said open lower end thereof; a filter mass within said chamber and filling the cross-sectional area thereof for separating and coalescing the entrainment from the primary fluid for passage downwardly to a lower portion of said shell, said mass having a generally downwardly facing undersurface supported and confined within the horizontal outline of said chamber open lower end and spaced from said shell lower portion; an outlet at the upper portion of said vertical passage at a location higher than said undersurface for discharge of the primary fluid leaving said chamber open lower end and flowing upwardly through said passage, the interior of said shell between said undersurface and said outlet being free of filter mass material which will effect coalescence of the entrainment; and a second outlet in said shell lower portion for discharging the separated entrainment.

10. The structure defined in claim 9 including a baffle in the shell beneath the chamber and filter mass undersurface for forming a relatively quiescent area in the shell lower portion for receiving the entrainment.

11. A liquid separator comprising: a closed shell having an upper access opening; a removable cover therefor; a chamber within said shell beneath said cover having an imperforate side wall spaced from a sidee wall of said shell to form a passage extending generally vertically therebetween, said chamber having an open lower end communicating with said passage; an inlet for introducing a primary fluid containing heavier liquid entrainment into an upper portion of said chamber for flow downwardly therethrough; a filter mass within said chamber and filling the cross-sectional area thereof for separating and coalescing the entrainment from the primary fluid for passage downwardly to a lower portion of said shell, said chamber and filter mass being formed separately from said cover and being upwardly removable from said shell through said access opening, and said filter mass being carried by said chamber for removal upwardly therewith, said filter mass having a generally downwardly facing undersurface supported and confined within the horizontal outline of said chamber open lower end and spaced from said shell lower portion; an outlet at the upper portion of said vertical passage for discharging the primary fluid, the interior of said shell between said undersurface and said outlet being free of filter mass material which will effect coalescence of the entrainment; and a second outlet in said shell lower portion for discharging the separated entrainment.

12. The structure defined in claim 11 including a baffle in the shell beneath the chamber and filter mass undersurface for forming a relatively quiescent area in the lower portion of said shell to receive the entrainment, and means attaching said baffle to said chamber for upward removal therewith.

13. Apparatus for separating a first liquid from a second and less dense liquid comprising: a shell; a chamber extending downwardly within said shell and spaced from a side wall thereof to form a passage extending generally vertically between said chamber and said wall, said chamber having an open lower end communicating with a lower portion of said vertical passage; an inlet for introducing the liquids into an upper portion of said chamber for flow downwardly therethrough toward said open lower end thereof; a filter mass within said chamber for separating and coalescing the first liquid from the second for passage downwardly to a lower portion of said shell; an outlet at the upper portion of said vertical passage for discharge of the second liquid flowing upwardly from said chamber open lower end and through said vertical passage; and an outlet in said shell lower portion for discharging the separated first liquid, said filter mass having a generally downwardly facing undersurface supported and confined within the horizontal outline of said chamber open lower end and spaced from all of the walls of said shell, said undersurface tapering downwardly to a lower end to lead the separated first liquid to a localized lower portion of said shell and the interior of said shell between said undersurface and said passage outlet being free of filter mass material which will effect coalescence of the first liquid.

14. The structure defined in claim 13 including a discharge tube for the first liquid leading downwardly from the lower end of the undersurface to the outlet in the shell lower portion.

15. A liquid separator comprising: means defining a continuous passageway for flow of fluid therethrough and having a substantially vertical downflow section, a substantially vertical upflow section, and a flow reversal section connecting the lower ends of said downflow and upflow sections; an inlet at the upper end of said downflow section for introducing into the separator, under pressure, a primary fluid containing heavier liquid entrainment; an outlet at the upper end of said upflow section for discharging the primary fluid from the separator; a filter mass within said downflow section for separating and coalescing the entrainment liquid from the primary fluid, said mass filling the cross-sectional area of said downflow section and having a generally downwardly facing undersurface confined within the horizontal outline of the lower end of said downflow section and generally opposed to and spaced from a generally upwardly facing lower wall portion of said flow reversal section, the minimum cross-sectional flow area of said flow reversal section being greater than the cross-sectional flow area of the lower end of said downflow section; perforate means confining and supporting said mass undersurface, said passageway in the direction of flow beyond said mass undersurface being substantially free of material which will effect coalescence of the entrainment liquid; and an outlet in the lowermost wall portion of said flow reversal section for discharging separated entrainment liquid from the separator.

16. The structure defined in claim 15 in which the inner surface of the lower wall portions of the flow reversal section is concavely curved.

17. The structure defined in claim 15 in which the separator includes a generally spherical shell, and a cylinder disposed vertically therewithin in spaced relation with the side and bottom wall portions of said shell, said cylinder constituting the downflow section, the annular space between said cylinder and shell side wall portions constituting the upflow section, and the remaining space in said shell below said cylinder constituting the flow reversal section.

References Cited in the file of this patent

UNITED STATES PATENTS

| | | |
|---|---|---|
| 575,508 | Hunt | Jan. 19, 1897 |
| 1,018,971 | Hamilton | Feb. 27, 1912 |
| 1,162,455 | Collins | Nov. 30, 1915 |
| 1,711,829 | Boon | May 7, 1929 |
| 1,723,374 | Roehr | Aug. 6, 1929 |
| 1,837,687 | Summers | Dec. 22, 1931 |
| 1,943,811 | Child et al. | Jan. 16, 1934 |
| 2,134,114 | Elliott | Oct. 25, 1938 |
| 2,216,300 | Shenk | Oct. 1, 1940 |
| 2,402,140 | Heintzelman | June 18, 1946 |

(Other references on following page)

UNITED STATES PATENTS

| | | |
|---|---|---|
| 2,412,841 | Spangler | Dec. 17, 1946 |
| 2,415,246 | Hunt | Feb. 4, 1947 |
| 2,468,382 | Taylor | Apr. 26, 1949 |
| 2,472,976 | Hoover | June 14, 1949 |
| 2,548,568 | Swank | Apr. 10, 1951 |
| 2,609,932 | Fricke | Sept. 9, 1952 |

FOREIGN PATENTS

| | | |
|---|---|---|
| 232,730 | Great Britain | Apr. 30, 1925 |
| 404,309 | Great Britain | Jan. 12, 1934 |
| 632,698 | Germany | July 11, 1936 |